(12) United States Patent
Liu et al.

(10) Patent No.: US 12,541,484 B2
(45) Date of Patent: Feb. 3, 2026

(54) MAINBOARD, PROCESSOR BOARD CARD AND COMPUTING SYSTEM

(71) Applicant: SUZHOU METABRAIN INTELLIGENT TECHNOLOGY CO., LTD., Jiangsu (CN)

(72) Inventors: Tiejun Liu, Jiangsu (CN); Rengang Li, Jiangsu (CN); Dafeng Han, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 3 days.

(21) Appl. No.: 18/703,359

(22) PCT Filed: Mar. 16, 2023

(86) PCT No.: PCT/CN2023/081986
§ 371 (c)(1),
(2) Date: Apr. 21, 2024

(87) PCT Pub. No.: WO2023/185495
PCT Pub. Date: Oct. 5, 2023

(65) Prior Publication Data
US 2025/0238394 A1    Jul. 24, 2025

(30) Foreign Application Priority Data
Mar. 31, 2022  (CN) .......................... 202210331199.0

(51) Int. Cl.
G06F 15/78 (2006.01)
G06F 13/16 (2006.01)
G06F 15/80 (2006.01)

(52) U.S. Cl.
CPC .............. *G06F 15/80* (2013.01); *G06F 13/16* (2013.01); *G06F 13/1668* (2013.01);
(Continued)

(58) Field of Classification Search
None
See application file for complete search history.

(56) References Cited

U.S. PATENT DOCUMENTS 6,036,551 A * 3/2000 Szczesny ........... H01R 12/7005
439/701
6,121,681 A * 9/2000 Tanaka .............. H01L 23/49541
361/748

(Continued)

FOREIGN PATENT DOCUMENTS

CN   113741648 A   12/2021
CN   114661099 A    6/2022

*Primary Examiner* — Michael Sun
(74) *Attorney, Agent, or Firm* — IPro, PLLC (57) ABSTRACT

A mainboard includes a plurality of interfaces, a first interface of the plurality of interfaces is configured to be connected to the processor board card having a processor circuit, a second interface of the plurality of interfaces is configured to be connected to a non-processor board card, and the first interface and the second interface are connected to each other via a communication circuit; for the mainboard, a connection-centric design idea is adopted, the processor board card is regarded to have the same status as the non-processor board card; because no processor circuit is provided, and only the first interface connected to the processor board card needs to be provided, compared with an original mainboard, an area of the board card in the present application is reduced, and the processor board card and other non-processor board cards may be connected to the mainboard in a stacked manner.

18 Claims, 5 Drawing Sheets

(52) U.S. Cl.
CPC ...... *G06F 15/7803* (2013.01); *G06F 15/7839* (2013.01); *G06F 15/7846* (2013.01)

(56) References Cited

U.S. PATENT DOCUMENTS

| | | | |
|---|---|---|---|
| 6,272,007 B1* | 8/2001 | Kitlas | G06F 1/185 |
| | | | 361/725 |
| 11,269,803 B1 | 3/2022 | Chou et al. | |
| 2014/0055467 A1* | 2/2014 | Bittner | G06F 3/14 |
| | | | 345/520 |
| 2016/0118121 A1* | 4/2016 | Kelly | G06F 1/30 |
| | | | 710/301 |
| 2019/0079890 A1 | 3/2019 | Matula et al. | |
| 2019/0305888 A1* | 10/2019 | Das Sharma | H04L 1/0071 |
| 2021/0151916 A1* | 5/2021 | Li | H01R 12/7076 |
| 2021/0315115 A1* | 10/2021 | Zhang | G06T 1/20 |
| 2021/0374056 A1* | 12/2021 | Malladi | G06F 13/4234 |

* cited by examiner

MAINBOARD, PROCESSOR BOARD CARD AND COMPUTING SYSTEM

CROSS-REFERENCE TO RELATED APPLICATION

The present application claims the priority of the Chinese patent application filed on Mar. 31, 2022 before the CNIPA, China National Intellectual Property Administration with the application number of 202210331199.0 and the title of "MAINBOARD, PROCESSOR BOARD CARD, AND COMPUTING SYSTEM", which is incorporated herein in its entirety by reference.

FIELD

The present application relates to the technical field of computers and more particularly, to a mainboard, a processor board card, and a computing system.

BACKGROUND

With the progress of an information technology, especially the development of an artificial intelligence technology, types and sizes of data which need to be acquired in various application scenarios are increasing, and various sensors such as image, video, voice, position, and posture sensors are generating mass data in real time. For a central processing unit (CPU) responsible for processing these data, the improvement in performance of the CPU is far lower than the increase in processing requirements. As a result, people begins to accomplish these computationally intensive tasks by using dedicated acceleration devices such as a graphics processing unit (GPU), a field programmable gate array (FPGA), and an application specific integrated circuit (ASIC), while the CPU only needs to be responsible for task scheduling and data aggregation. When devices with an outstanding parallel computing capability such as the FPGA or GPU participate in collaborative processing, they will have frequent and massive data interaction with the CPU, and a high-bandwidth low-latency connection means has become the core requirement of hardware architecture, typically for example, automatic driving, vehicle-road collaboration, and other edge computing systems involving perception and decision-making.

Currently, hardware devices such as the edge computing system include a CPU system, a sensor acquisition system, and an AI computing system. Common solutions adopted in the industry are to implement the CPU system by using an industrial personal computer or edge computing server, implement the sensor acquisition system by using an FPGA or ASIC chip, and implement the AI computing system by using the GPU. This system implementation of CPU+FPGA+GPU is generally in the form of disposing a mainboard in a computer case and loading an FPGA card and a GPU card on the mainboard in terms of hardware. However, current CPU systems are generally disposed on the mainboard directly, and in order to be connected to other non-CPU board cards, additional slots need to be formed in the mainboard, which results in a larger area of the mainboard. In addition, in response to a new CPU of a different type being needed for replacement due to a scene change, a separate mainboard, case structure and the like need to be disposed for the new CPU, so that the workload is relatively heavy.

SUMMARY

In view of the above, an object of the present application is to provide a mainboard, a processor board card, and a computing system, which reduce the requirements for the space in a device, and reduce the workload of designing the mainboard.

In order to solve the technical problem above, the present application provides a mainboard, including:
  a plurality of interfaces, wherein a first interface of the plurality of interfaces is configured to be connected to a processor board card having a processor circuit, a second interface of the plurality of interfaces is configured to be connected to a non-processor board card, and the first interface and the second interface are connected to each other via a communication circuit;
  wherein the processor circuit on the processor board card runs based on a target memory, the target memory includes a first memory, or includes the first memory and a second memory, the first memory is located on the processor board card, and the second memory is located on the non-processor board card.

In some embodiments, the processor board card and the non-processor board card are perpendicular to a plane of the mainboard, and connected to the mainboard in a stacked manner.

In some embodiments, a capacity of the first memory is smaller than a capacity of the second memory.

In some embodiments, further including a switch chip, wherein the plurality of interfaces are connected to the switch chip via the communication circuit.

In some embodiments, the first interface is an upstream interface of the switch chip, and the second interface is a downstream interface of the switch chip.

In some embodiments, the non-processor board cards connected to different second interfaces access each other in a peer to peer (P2P) manner.

In some embodiments, a quantity of the first interfaces is at least two, and the first interfaces are interconnected based on a coherency protocol.

In some embodiments, further including a power supply component, wherein the power supply component supplies power to the plurality of interfaces via a first power supply circuit.

In some embodiments, further including a power supply interface, wherein the power supply interface is configured to be connected to an external board card, and the power supply component supplies power to the power supply interface via a second power supply circuit.

In some embodiments, the power supply component is a direct-current power supply component or an alternating-current power supply component.

In some embodiments, the power supply component supplies power to the switch chip.

In some embodiments, the power supply component is a component that does not need to be connected to the outside.

In some embodiments, further including a baseboard management controller, wherein the baseboard management controller is connected to the plurality of interfaces via a control circuit.

In some embodiments, the baseboard management controller is connected to a temperature control component via the control circuit for controlling the temperature control component.

In some embodiments, the non-processor board card on which the second memory is located is a memory expansion card, and the memory expansion card includes a memory controller and a memory expansion slot.

In some embodiments, the first interface is any one of interfaces based on a PCIe4.0 protocol, based on a PCIe5.0 protocol, and based on a Gen-Z protocol in type.

In some embodiments, the first memory is in a memory particle form and is welded on the processor board card.

The present application further provides a processor board card, including a processor circuit, a first memory, and a communication connector, wherein the communication connector is configured to be connected to the first interface in the mainboard described above, the processor circuit runs based on the target memory, the target memory includes the first memory, or includes the first memory and the second memory; and the second memory is located on the non-processor board card connected to the mainboard.

The present application further provides a computing system, wherein the computing system includes the mainboard described above, the processor board card described above, and a non-processor board card; the communication connector on the processor board card is connected to the first interface in the mainboard, and a communication connector on the non-processor board card is connected to the second interface in the mainboard.

In some embodiments, further including a target cable, wherein the target cable is configured to connect target ports in any two board cards.

For the mainboard provided in the present application, the mainboard includes the plurality of interfaces, wherein the first interface of the interfaces is configured to be connected to the processor board card having the processor circuit, the second interface of the interfaces is configured to be connected to the non-processor board card, and the first interface and the second interface are connected to each other via the communication circuit; wherein the processor circuit on the processor board card runs based on the target memory, the target memory includes the first memory, or includes the first memory and the second memory, the first memory is located on the processor board card, and the second memory is located on the non-processor board card.

It may be seen that for the mainboard, a connection-centric design idea is adopted, and a conventional CPU-centric hardware design idea is abandoned. It will be understood that no matter what type of CPU is adopted, the CPU needs to be connected to the non-processor board card, so that in the present application, the mainboard is designed as a board card having no processor circuit and only providing a connection function, and on the mainboard, the first interface configured to be connected to the processor board card, and the second interface configured to be connected to the non-processor board card, in addition, there is a communication circuit configured to connect the first interface to the second interface. By the above settings, the processor board card may be regarded to have the same status as the non-processor board card. Because the mainboard has no processor circuit and only needs to provide the first interface connected to the processor board card, compared with an original mainboard, an area of the board card in the present application is reduced, while the processor board card and other non-processor board cards may be connected to the mainboard in a stacked manner, thereby reducing the required space, and reducing the requirements for the space in the device. In addition, no matter how the type of the CPU changes, the CPU has the same standard for external communication, so that processor board cards having different processor circuits may be connected to the mainboard via the first interface. In response to a new CPU of a different type being needed for replacement due to a scene change, the mainboard does not need to be designed separately, and the processor board card may be replaced directly, so that the workload of designing the mainboard is reduced. In addition, the mainboard may also support the processor circuit to run based on the second memory on the non-processor board card when needed, thereby improving the running flexibility of the processor board card.

In addition, the present application further provides a processor board card and a computing system, which also have the beneficial effects above.

BRIEF DESCRIPTION OF THE DRAWINGS

In order to provide a clearer explanation of the technical solutions in the embodiments of the present application or related art, a brief introduction will be made to the accompanying drawings required in descriptions of the embodiments or related technical. It is obvious that the accompanying drawings in the following description are only embodiments of the present application. For those skilled in the art, other accompanying drawings may be obtained based on the provided drawings without creative labor.

DETAILED DESCRIPTION

In order to clarify the purpose, technical solution, and advantages of the present embodiment, the following will provide a clear and complete description of the technical solution in the present embodiment in conjunction with the accompanying drawings. Obviously, the described embodiments are only a part of the present embodiment, not the entire embodiment. Based on the embodiments in the present application, all other embodiments obtained by ordinary technical personnel in this field without creative labor fall within the scope of protection of the present application.

Figure 1:
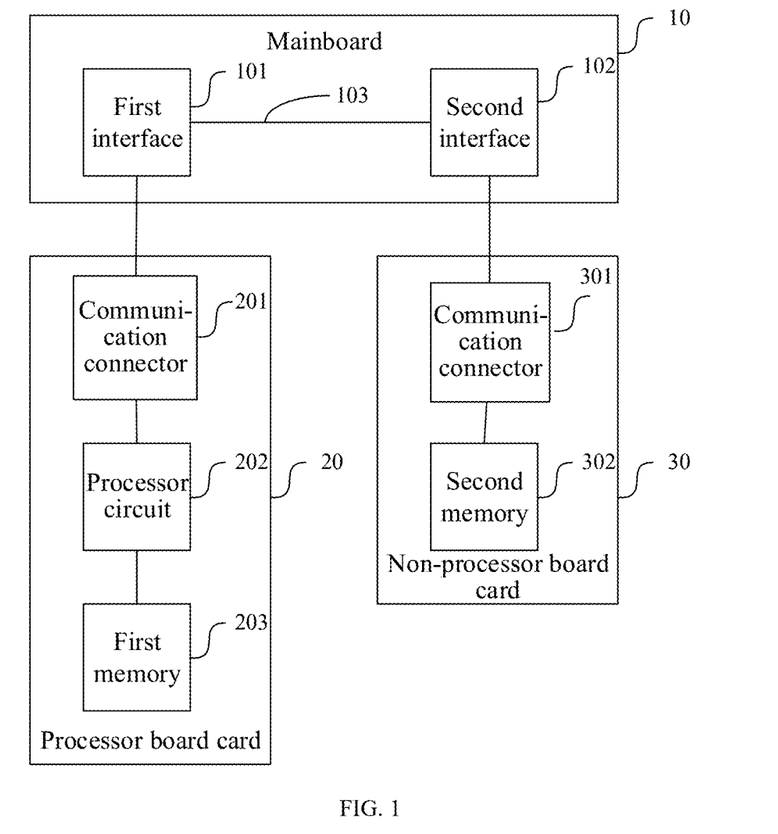
FIG. 1 is a schematic structural diagram of a computing system according to an embodiment of the present application.

FIG. 1 is a schematic structural diagram of a computing system provided by an embodiment of the present application, wherein the computing system includes a mainboard 10, a processor board card 20, and a non-processor board card 30. The non-processor board card refers to a board card having no processor circuit, for example, the non-processor board card may be an FPGA board card, a GPU board card or an ASIC board card. The processor board card refers to a board card having a processor and related circuits, and the processor and the related circuits may be collectively referred to as processor circuits. It may be seen that the mainboard 10 is adopted for connecting the processor board card 20 to the non-processor board card 30 in the present application.

In some embodiments, the mainboard 10 includes a plurality of interfaces, a first interface 101 of the interfaces is configured to be connected to the processor board card 20 having the processor circuit, a second interface 102 of the interfaces is configured to be connected to the non-processor board card 30, and the first interface 101 and the second interface 102 are connected to each other via a communication circuit 103. In some embodiments, the first interface 101 is configured to be connected to a communication connector 201 on the processor board card 20, and the communication connector 201 is connected to the processor circuit 202, so as to achieve communication between the processor circuit 202 and the mainboard 10. In addition, the non-processor board card 30 also has a communication connector 301 connected to the second interface 102, and the processor circuit 202 may communicate with the non-processor board card 30 via the communication circuit 103, so as to achieve functions which may be achieved by the mainboard obtained by a current conventional processor-centric design idea.

Namely, a connection-centric design idea is adopted on the mainboard 10 in the present application, and the mainboard only has interfaces connected to external board cards and a communication circuit between the interfaces, and only provides a connection function. It will be understood that no matter what type of CPU is adopted, the CPU needs to be connected to the non-processor board card, so that in the present application, the mainboard is designed as the board card having no processor circuit and only providing the connection function. With the arrangement above, the processor board card may be considered to be equivalent to the non-processor board card. Because the mainboard has no processor circuit, compared with an original mainboard, an area of the board card of the mainboard is reduced, while the processor board card and other non-processor board cards may be perpendicular to a plane of the mainboard, and the processor board card and other non-processor board cards are of a stacked structure, thereby reducing the required space, and reducing the requirements for the space in the device. In addition, no matter how the type of the CPU changes, the CPU has the same standard for external communication, so that the processor board cards having different processor circuits may be connected to the mainboard via the first interface. In response to a new CPU of a different type being needed for replacement due to a scene change, the mainboard does not need to be designed separately, and the processor board card may be replaced directly, so that the workload of designing the mainboard is reduced. It should be noted that a type of the first interface is not limited, for example, the first interface may be interfaces based on a PCIe4.0 protocol, based on a PCIe5.0 protocol, or based on a Gen-Z protocol.

Figure 2:
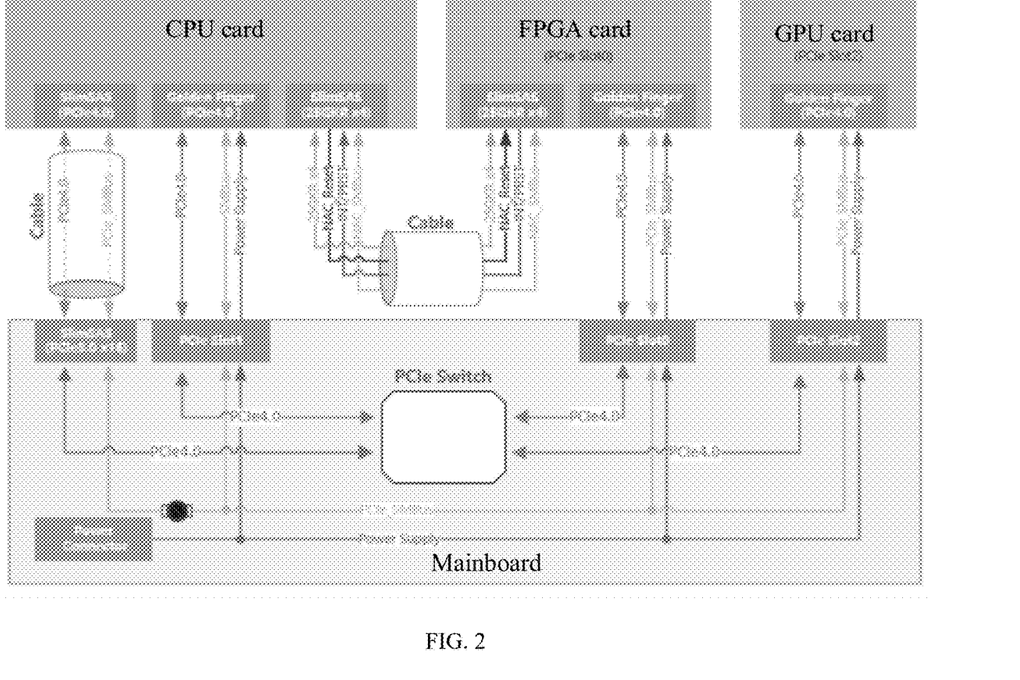
FIG. 2 is a schematic structural diagram of a detailed computing system according to an embodiment of the present application.

In order to more flexibly control and arbitrate data exchange via the communication circuit, and further improve the communication flexibility, the mainboard may further include a switch chip, the switch chip is connected to the interface via the communication circuit, and then schedules data input or output by the interface, thereby avoiding the problem that a limited communication capability of the processor circuit leads to a limited quantity of the non-processor board cards which communicate with the processor board cards while improving the communication flexibility. FIG. 2 is a schematic structural diagram of a computing system provided by an embodiment of the present application, among them, a mainboard shown in FIG. 2 has a PCIe switch chip, and a type may be PEX8749. Accordingly, the interfaces in the mainboard are PCIe bus interfaces, and in some embodiments, are PCIe4.0 interfaces, including three interfaces of PCIe slot0, PCIe slot1 and PCIe slot2, and further including a slimSAS (PCIe3.0x16) interface. Among them, the two interfaces of PCIe slot1 and slimSAS are the first interfaces, and the two interfaces of PCIe slot0 and PCIe slot2 are the second interfaces; a CPU card is the processor board card, and Golden Finger (PCIe4.0) on the CPU card is a communication connector on the processor board card. Accordingly, an FPGA card and a GPU card are both non-processor board cards, and Golden Finger (PCIe4.0) on the FPGA card and the GPU card is also the communication connector on the non-processor board cards. In a running process, a sensor acquisition system may be implemented by utilizing the FPGA card, an AI computing system may be implemented by utilizing the GPU card, and a computing system serving as an edge server, an industrial personal computer and the like is formed by matching the FPGA card and the GPU card with a CPU.

Further, in another embodiment, when the mainboard is connected to a plurality of non-processor board cards, in order to further improve the communication flexibility, an upstream interface of the switch chip may be configured as the first interface, and a downstream interface of the switch chip may be configured as the second interface. With the configuration above, the non-processor board cards connected to different second interfaces may access each other in a peer to peer (P2P) manner without scheduling via the processor board card, which embodies the feature of flexibility and efficiency of connection-centric architecture. For example, reference may be made to FIG. 2, PCIe slot0 and PCIe slot2 in FIG. 2 are the second interfaces, and when the second interfaces are both downstream interfaces of the PCIe switch, the FPGA card and the GPU card may directly communicate with each other.

In addition, in another embodiment, in order to improve the data processing capability, the mainboard may have at least two first interfaces, each first interface is connected to a processor board card respectively, and the whole computing system may have at least two sets of processor circuits for data processing; and in order to ensure that the computing system may run normally, various first interfaces between board cards are interconnected based on a consistency protocol. In some embodiments, the mainboard may include a coherency protocol interface, such as UPI (Ultra Path Interconnect), AXI (Advanced eXtensible Interface), and CCIX (chip-to-chip coherent interconnect protocol). The processor board card may be connected to the coherency protocol interface, thereby enabling various processor circuits to process data as a whole.

It will be understood that in another embodiment, the mainboard is also configured to supply power to other board cards, therefore the mainboard may include a power supply component, and the power supply component supplies power to the interface via a first power supply circuit. The processor board card and the non-processor board card obtain the power supplied by the mainboard via the interface. The power supply component may be a direct-current power supply component or may be an alternating-current power supply component. For example, a power connector of the mainboard in FIG. 2 is the power supply component which may be connected to an external power supply and externally supplies power via a power supply line (namely, a first power supply line). In another embodiment, the power supply component on the mainboard may be a component which does not need to be connected to outside, for example, may be a battery power supply component. It will be understood that in addition to supplying power to the interface, the power supply component may also supply power to other components on the mainboard, for example, supply power to the switch chip.

Further, as the interface may provide relatively limited power, for example, the PCIe interface typically may provide 75 W of power, the 75 W of power may not support running of some processor board cards or non-processor board cards. Therefore, in another embodiment, the mainboard further includes a power supply interface, wherein the power supply interface is configured to be connected to an external board card, and the external board card may be the processor board card or the non-processor board card. The power supply component supplies power to the power supply interface via a second power supply circuit, so that the external board card may obtain power from a path other than the interface. The power, voltage or current of the power supply interface, and a type of the interface are all not limited in this embodiment.

In another embodiment, the mainboard may also include a baseboard management controller (BMC), typically, there is only one BMC in one computing system, so that the BMC may be connected to the interface above via a control circuit to manage the processor board card and the non-processor board card. The control circuit may be an inter-integrated circuit (I2C) bus circuit or a circuit of other types. The detailed management contents are not limited in this embodiment, for example, may include temperature control (namely, heat dissipation regulation and control), state supervision, power supply control, and the like. In FIG. 2, the BMC is disposed on the mainboard, and is connected to the interface via a PCIe_SMBus (namely, the control circuit). Further, a temperature in the computing system significantly affects an operational state of the hardware, and therefore in one embodiment, the BMC is connected to a temperature control component via the control circuit to control the temperature control component based on a detected temperature state. The temperature control component may be located on the mainboard or may be located on the external board card, and may be in the form of a fan.

Based on any one of the embodiments above, in order to further improve the communication flexibility, the computing system may further have a target cable, the target cable may connect target ports in any two board cards, and it should be noted that the target cable is matched with the target ports by adopting a communication protocol. In some embodiments, FIG. 2 has two cables, the SlimSAS (PCIe3.0x16) interface of the mainboard is connected to the SlimSAS (PCIe4.0) interface in the processor board card by one cable, and the SlimSAS (25GKRx4) interface in the processor board card is connected to the SlimSAS (25GKRx4) interface in the FPGA card by the other cable. By disposing the target cables, the communication flexibility of the system may be further improved.

Figure 3:
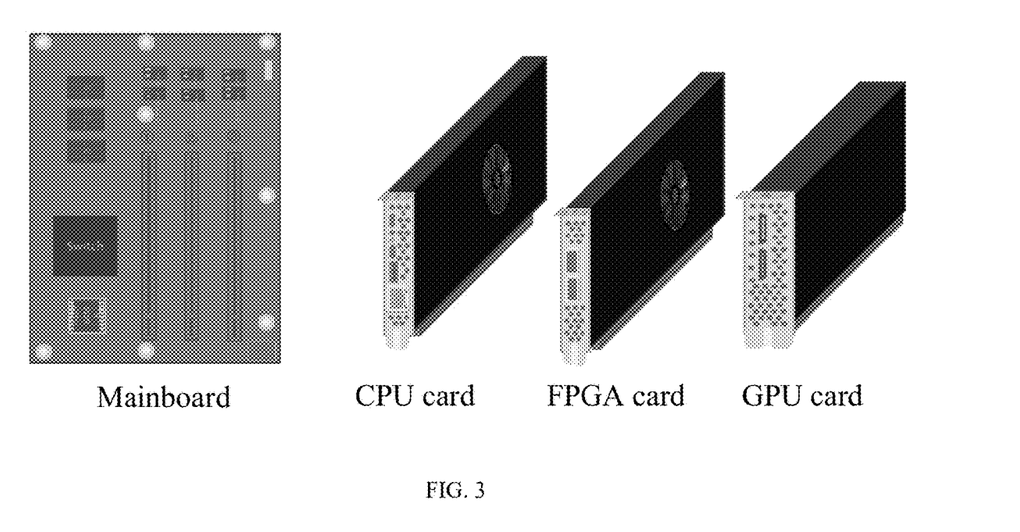
FIG. 3 is a schematic diagram of components of a computing system according to an embodiment of the present application.

In practical applications, other external board cards which are not mainboards are generally disposed on the mainboard perpendicular to a plane on which the mainboard is located. FIG. 3 is a schematic diagram of components of the computing system provided by an embodiment of the present application, wherein various components in hardware architecture of FIG. 2 are shown as connected. It may be seen that after the processor circuit is discarded, an area of the mainboard is greatly reduced. The CPU card, the FPGA card, and the GPU card are inserted into interfaces in the form of slots in the mainboard respectively, and the three cards are disposed in a stacked form and are all within a coverage area of the mainboard, so that the computing system does not occupy the space in a direction of the plane on which the mainboard is located. In a direction perpendicular to the plane on which the mainboard is located, because the FPGA card originally occupies a certain length space, even if the CPU card is added on the original basis, the occupied space may not be increased, and therefore the occupied space of the computing system is sharply reduced. In practical detection, the area of the mainboard provided by the present application is smaller than that of a full-height full-length (110x300 mm) PCIe standard card, so that the case size of a complete machine is effectively controlled. Furthermore, due to the relatively simple requirements, the CPU card may also be implemented in the space of a full-height ¾-length (110x254 mm) PCIe card.

Figure 4:
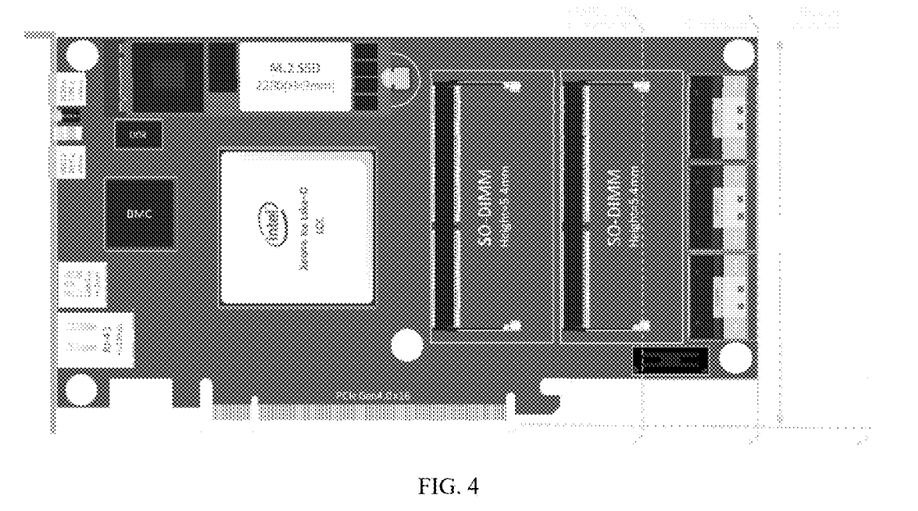
FIG. 4 is a schematic structural diagram of a processor board card according to an embodiment of the present application.

FIG. 4 is a schematic structural diagram of a processor board card provided by an embodiment of the present application. It may be seen that the processor board card includes an intel processor, various components such as a BIOS, a memory, an IO component, and a storage component, as well as related connecting circuits, which collectively constitute a processor circuit. In addition, the processor board card further includes Golden Finger PCIeGen4.0x16 as a communication connector. In addition, when the BMC is not present on the mainboard, the BMC may be disposed on the processor board card.

Figure 5:
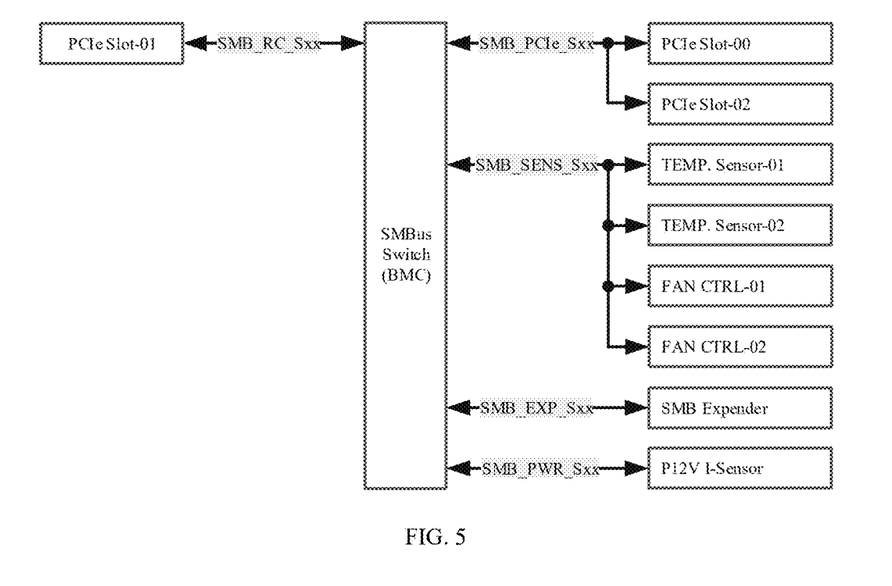
FIG. 5 is a topological structure diagram of a control circuit according to an embodiment of the present application.

FIG. 5 is a topological structure diagram of a control circuit provided by an embodiment of the present application, wherein SMBus switch is the BMC which is connected to a power supply sensor (namely, P12V I-Sensor), fan control components (namely, FAN CTRL-01 and FAN CTRL-02), temperature sensors (namely, TEMP, Sensor-01 and TEMP, Sensor-02), interfaces (namely, PCIe Slot-00, PCIe Slot-01, and PCIe Slot-02), and an SMB expander (namely, system management bus (SMB) expender) via control circuits respectively.

Figure 6:
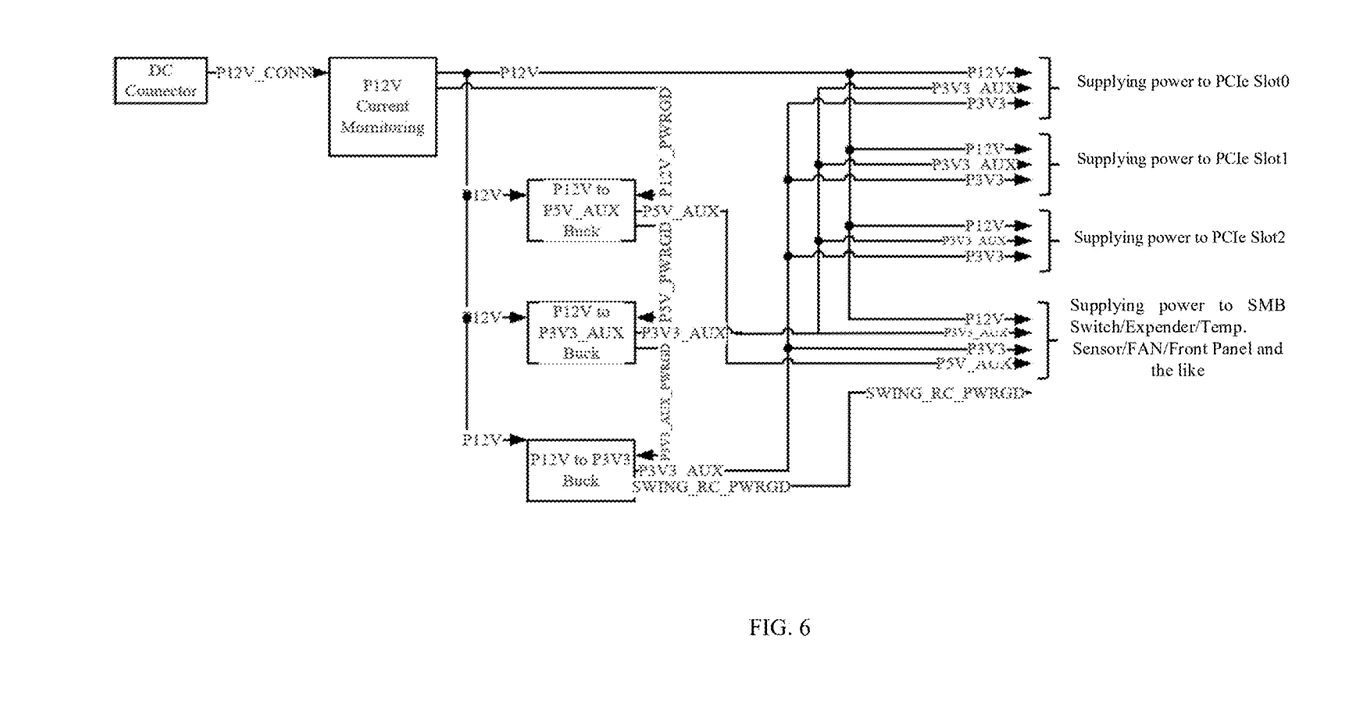
FIG. 6 is a topological structure diagram of a mainboard power supply system according to an embodiment of the present application.

FIG. 6 is a topological structure diagram of a mainboard power supply system provided by an embodiment of the present application, wherein a DC connector is a direct-current power connector for introducing direct-current power and externally supplying power via a 12V current detection unit, including directly providing 12V voltage, or obtaining 5V and 3.3V voltages after processing of converting 12V to 5V and converting 12V to 3.3V. Power is supplied to interfaces (namely, PCIe Slot0, PCIe Slot1, and PCIe Slot2), as well as to a BMC (SMB switch), a temperature sensor (TEMP. Sensor), a front panel (front panel), an SMB expander (Expender), a fan (FAN), and the like by the currents above.

It should be noted that in the present application, the mainboard may support the processor board card to call the second memory which does not belong to it to run the processor circuit. In some embodiments, the processor circuit on the processor board card runs based on the target memory, wherein the target memory includes the first memory, or includes the first memory and the second memory, the first memory is located on the processor board card and may be referred to as a near-end memory, and the second memory is located on the non-processor board card and may be referred to as a far-end memory. That is to say, in the present application, when needed, the processor board card may call the second memory on the non-processor board card, perform data transmission via the mainboard, and store data generated when the processor circuit runs in the second memory on the non-processor board card. The processor board card performs read-write access to the second memory on the non-processor board card via a high-speed serial bus link formed by the first interface, the mainboard, and the second interface. In order to achieve this function, the mainboard may support a cache consistency protocol, so that the high-speed serial bus link formed by the participation of the mainboard may support the cache consistency protocol, and an implementation process of the protocol may be set according to requirements, which will not be described in detail herein.

The size and form of the first memory and the second memory are not limited, and in one embodiment, in order to reduce the design difficulty of the processor board card and facilitate heat dissipation simultaneously, the first memory may be directly welded on the processor board card in a memory particle form rather than in a memory-chip form. The conventional CPU have two or more memory channels, with each memory channel corresponding to one or two memory slots, and each memory slot corresponding to a first memory-chip. Each memory slot needs at least 260 pins. The more the memory slots are, the larger the occupied space of the circuit board will be, so that more wires need to be connected between the CPU and the memory slots, and a larger quantity of layers of circuit boards are needed, thereby increasing the area of the circuit boards, the quantity of the wires, and the quantity of layers of the circuit boards of the processor board card, and raising the design difficulty. By adopting the first memory in the particle form, compared with a bulky memory slot, the heat dissipation is easier, and the design difficulty of the board card is lower.

In addition, in order to reduce power consumption, the first memory may have a capacity smaller than that of the second memory, and in one embodiment, the capacity of the first memory may support start-up and initialization operation of the processor circuit, and the far-end memory may be called in a subsequent business process.

Figure 7:
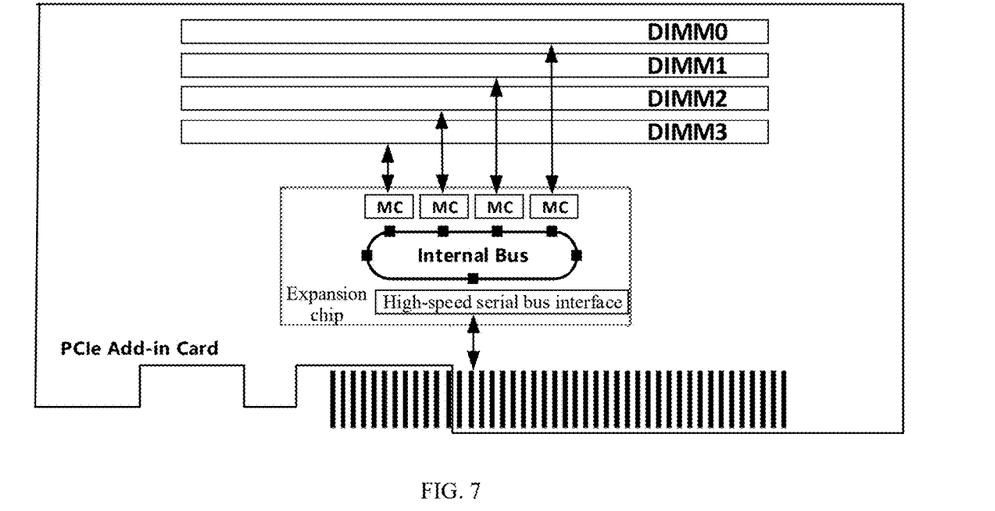
FIG. 7 is a topological structure diagram of a memory expansion card according to an embodiment of the present application.

The form and type of the non-processor board card to which the second memory belongs are not limited in this example, and in one embodiment, and a dedicated memory expansion card may be disposed. FIG. 7 is a topological structure diagram of a memory expansion card provided by an example of the present application. The memory expansion card includes an expansion chip, and the expansion chip includes a memory controller. In addition, a plurality of memory expansion slots are further included, and each memory controller controls one memory expansion slot, and the control mode is not limited. The expansion chip further includes a high-speed serial bus interface for being connected to Golden Finger and further connected to the mainboard.

Figure 8:
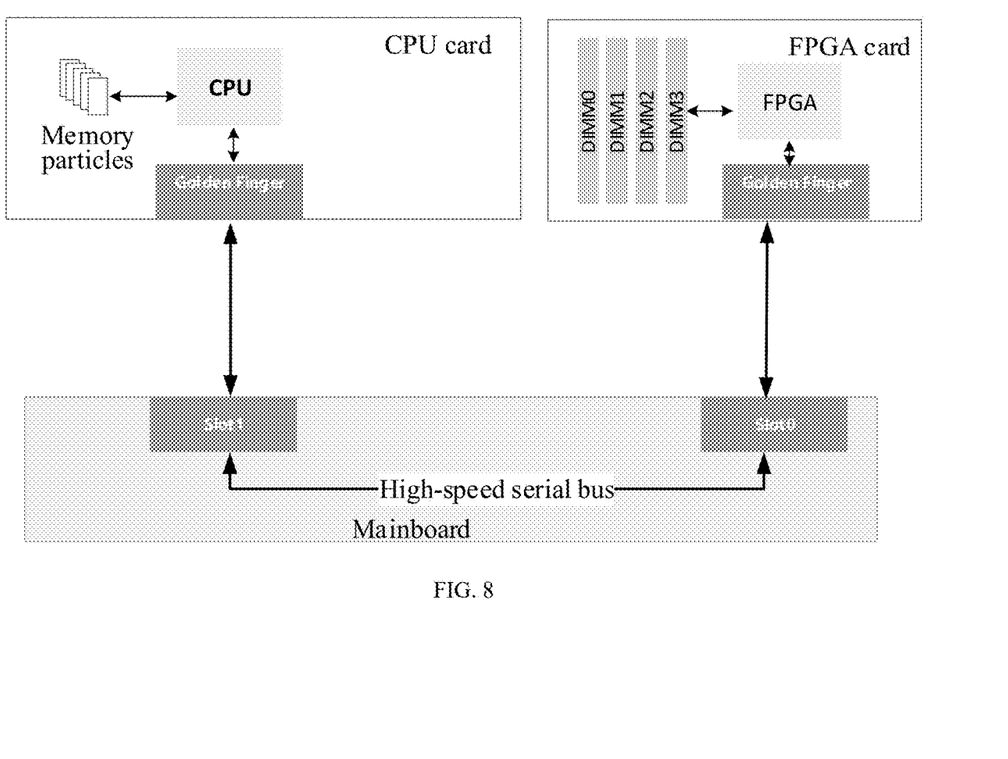
FIG. 8 is a schematic diagram of an application scenario of a memory expansion application according to an embodiment of the present application.

In another embodiment, the second memory may be located on other board cards with a computing function such as an FPGA card and an ASIC card, and these computing board cards also have memories for supporting own running. These memories may be divided into portions as secondary memories when needed. FIG. 8 is a schematic diagram of an application scenario of a memory expansion application provided by an example of the present application, wherein the CPU card may access the memory on the FGPA card via the high-speed serial bus provided on the mainboard.

It may be seen that in one embodiment, when the CPU card, the memory expansion card, and the non-processor board card of the non-memory expansion card are present in the whole computing system, there are three types of memories available for the processor circuit. In this case, a corresponding memory priority may be set, and the processor circuit may select the memory according to the memory priority. In some embodiments, the processor circuit may preferentially use the near-end memory. When the requirements may not be met, the memory on an accelerator card such as the FPGA card/GPU card may be further used as the second memory, and the size of the second memory is determined by negotiation between the CPU card and the accelerator card, or is determined by the acceleration card according to the requirements thereof. When the requirements may still not be met, finally the memory expansion card is used.

Persons skilled in the art may further realize that the units and algorithm steps of each example described in the embodiments of the present application may be implemented in electronic hardware, computer software, or a combination of the two. In order to clearly illustrate the interchangeability of hardware and software, the composition and steps of each example have been described in general terms of functionality in the above description. Whether these functions are executed in hardware or software depends on the specific application and design constraints of the technical solution. Persons skilled in the art may use different methods to implement the described functions for each specific application, but such implementation should not be considered beyond the scope of the present application.

Finally, it should be noted that in this specification, relationships such as first and second are only used to distinguish one entity or operation from another entity or operation, without necessarily requiring or implying any such actual relationship or order between these entities or operations. Moreover, the term including, comprising, or any other variant is intended to encompass non-exclusive inclusion, such that a process, method, item, or device that includes a series of elements not only includes those elements, but also includes other elements that are not explicitly listed, or also includes elements inherent to such a process, method, item, or device.

This specification applies specific examples to explain the principles and implementation methods of the present application. The above examples are only used to help understand the methods and core ideas of the present application. Meanwhile, for persons skilled in the art, there may be changes in specific implementation methods and application scope based on the ideas of the present application. Therefore, the content of this specification should not be understood as a limitation on the present application.

The invention claimed is:

1. A mainboard, wherein the mainboard comprises a plurality of interfaces, a first interface of the plurality of interfaces is configured to be connected to a processor board card having a processor circuit, a second interface of the plurality of interfaces is configured to be connected to a non-processor board card, and the first interface and the second interface are connected to each other via a communication circuit;

the processor circuit on the processor board card runs based on a target memory, the target memory comprises a first memory, or comprises the first memory and a second memory, the first memory is located on the processor board card, and the second memory is located on the non-processor board card; and the first interface is any one of interfaces based on a PCIe4.0 protocol, based on a PCIe5.0 protocol, and based on a Gen-Z protocol in type.

2. The mainboard according to claim 1, wherein the processor board card and the non-processor board card are of a stacked structure, and the processor board card and the non-processor board card are perpendicular to a plane of the mainboard.

3. The mainboard according to claim 1, wherein a capacity of the first memory is smaller than a capacity of the second memory.

4. The mainboard according to claim 1, further comprising a switch chip, wherein the plurality of interfaces are connected to the switch chip via the communication circuit.

5. The mainboard according to claim 4, wherein the first interface is an upstream interface of the switch chip, and the second interface is a downstream interface of the switch chip.

6. The mainboard according to claim 5, wherein the non-processor board cards connected to different second interfaces access each other in a peer to peer (P2P) manner.

7. The mainboard according to claim 5, wherein a quantity of the first interfaces is at least two, and the first interfaces are interconnected based on a coherency protocol.

8. The mainboard according to claim 1, further comprising a power supply component, wherein the power supply component supplies power to the plurality of interfaces via a first power supply circuit.

9. The mainboard according to claim 8, further comprising a power supply interface, wherein the power supply interface is configured to be connected to an external board card, and the power supply component supplies power to the power supply interface via a second power supply circuit.

10. The mainboard according to claim 8, wherein the power supply component is a direct-current power supply component or an alternating-current power supply component.

11. The mainboard according to claim 8, wherein the mainboard further comprises a switch chip, the power supply component supplies power to the switch chip.

12. The mainboard according to claim 8, wherein the power supply component is a battery power supply component.

13. The mainboard according to claim 1, further comprising a baseboard management controller, wherein the baseboard management controller is connected to the plurality of interfaces via a control circuit.

14. The mainboard according to claim 13, wherein the baseboard management controller is connected to a temperature control component via the control circuit for controlling the temperature control component.

15. The mainboard according to claim 1, wherein the non-processor board card on which the second memory is located is a memory expansion card, and the memory expansion card comprises a memory controller and a memory expansion slot.

16. A processor board card, comprising a processor circuit, a first memory, and a communication connector, wherein the communication connector is configured to be connected to a first interface in a mainboard, the mainboard comprises a plurality of interfaces, a second interface of the plurality of interfaces is configured to be connected to a non-processor board card, and the first interface and the second interface are connected to each other via a communication circuit;

the processor circuit on the processor board card runs based on a target memory, the target memory comprises a first memory, or comprises the first memory and a second memory, the first memory is located on the processor board card, and the second memory is located on the non-processor board card; and the first memory is in a memory particle form and is welded on the processor board card.

17. A computing system, wherein the computing system comprises a mainboard, a processor board card and a non-processor board card;

the mainboard comprises a plurality of interfaces, a first interface of the plurality of interfaces is configured to be connected to a processor board card having a processor circuit, a second interface of the plurality of interfaces is configured to be connected to a non-processor board card, and the first interface and the second interface are connected to each other via a communication circuit;

the processor circuit on the processor board card runs based on a target memory, the target memory comprises a first memory, or comprises the first memory and a second memory, the first memory is located on the processor board card, and the second memory is located on the non-processor board card;

the first interface is any one of interfaces based on a PCIe4.0 protocol, based on a PCIe5.0 protocol, and based on a Gen-Z protocol in type;

the processor board card comprises a processor circuit, a first memory, and a communication connector, wherein the communication connector on the processor board card is connected to the first interface in the mainboard, and a communication connector on the non-processor board card is connected to the second interface in the mainboard; and the first memory is in a memory particle form and is welded on the processor board card.

18. The computing system according to claim 17, further comprising a target cable, wherein the target cable is configured to connect target ports in any two board cards.

* * * * *